(12) United States Patent
Swift

(10) Patent No.: US 9,262,765 B2
(45) Date of Patent: Feb. 16, 2016

(54) SYSTEM, METHOD, AND PROGRAM PRODUCT FOR IDENTIFYING AND PROVIDING SUGGESTIONS

(75) Inventor: Darci Louise Swift, Tuckton (GB)

(73) Assignee: Smartfocus Holdings Limited (GB)

(*) Notice: Subject to any disclaimer, the term of this patent is extended or adjusted under 35 U.S.C. 154(b) by 817 days.

(21) Appl. No.: 12/345,631

(22) Filed: Dec. 29, 2008

(65) Prior Publication Data

US 2010/0005400 A1 Jan. 7, 2010

Related U.S. Application Data

(60) Provisional application No. 61/027,802, filed on Feb. 11, 2008.

(51) Int. Cl.
*G06F 3/048* (2013.01)
*G06Q 30/02* (2012.01)

(52) U.S. Cl.
CPC ...................................... *G06Q 30/02* (2013.01)

(58) Field of Classification Search
USPC ....................................................... 705/14.53
See application file for complete search history.

(56) References Cited

U.S. PATENT DOCUMENTS

| | | | | | |
|---|---|---|---|---|---|
| 5,918,014 | A | * | 6/1999 | Robinson | 709/219 |
| 5,937,392 | A | * | 8/1999 | Alberts | 705/14.52 |
| 2002/0123912 | A1 | * | 9/2002 | Subramanian et al. | 705/5 |
| 2003/0195884 | A1 | * | 10/2003 | Boyd et al. | 707/7 |
| 2006/0282504 | A1 | * | 12/2006 | Yoshioka et al. | 709/207 |
| 2007/0294080 | A1 | * | 12/2007 | Bangalore | 704/7 |
| 2008/0103897 | A1 | * | 5/2008 | Flake et al. | 705/14 |
| 2008/0243632 | A1 | * | 10/2008 | Kane et al. | 705/26 |
| 2009/0030792 | A1 | * | 1/2009 | Khivesara et al. | 705/14 |
| 2009/0172551 | A1 | * | 7/2009 | Kane et al. | 715/733 |

* cited by examiner

*Primary Examiner* — William Trapanese
(74) *Attorney, Agent, or Firm* — Rajesh Vallabh; Foley Hoag LLP

(57) ABSTRACT

A system, method, and program product for identifying and providing suggestions includes registering information of a behavior of a user in an environment within a domain. Behavior processes identify the behavior, identify an item associated with the behavior, identify an identity of the user, and store the identified information. Task processes prepare a suggestion list using the information and a stored configuration. A participant account in the environment requests suggestions to serve to the user where the participant account belongs to a participant belonging to a group of affiliated participants. Suggestion processes identify a request item, identify the identity of the user and attributes associated with the request, aggregate suggestions using the stored configuration and a suggestion list set, and record served suggestions. The participant account receives the served suggestions where the participant account can offer the served suggestions on behalf of an affiliated participant.

24 Claims, 3 Drawing Sheets

SYSTEM, METHOD, AND PROGRAM PRODUCT FOR IDENTIFYING AND PROVIDING SUGGESTIONS

CROSS-REFERENCE TO RELATED APPLICATIONS

The present Utility patent application claims priority benefit of the U.S. provisional application for patent Ser. No. 61/027,802 filed on Feb. 11, 2008 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to Internet advertising. More particularly, the invention relates to an Affiliated Suggestion Framework (ASF) with advanced features for providing recommendations, personalization, and targeted advertising through the Internet.

BACKGROUND OF THE INVENTION

The Internet has afforded the possibility to innovate new products and services. One of the areas exposed via the Internet is that of recommendations, personalization and targeted advertising, collectively referred to herein as suggestions. Currently, there are many computer systems that support sophisticated suggestions.

In most instances a server makes suggestions available to a client. A server is typically a high throughput, fault tolerant combination of infrastructure, operating software and application software. The servers typically communicate with the client using common IP based protocols, for example, without limitation, hypertext transfer protocol (HTTP), hypertext transfer protocol secure (HTTPS), etc.

There are many approaches to identifying applicable suggestions. These approaches tend to be implemented by the following methods: by basing the suggestions upon analysis of tracked user behavior, or by allowing third parties, typically humans or other computer systems, to explicitly configure suggestions and/or suggestion associations. In each case, many algorithms exist for achieving the identification of said suggestions.

Currently known methods for the aggregation of suggestions originating from many sources describe a framework that provides recommendations sourced from a set of 'plug-in' recommendation producers. This framework is essentially a generic mechanism for serving suggestions to a connecting device. Other known methods describe an element of affiliation. However, these currently known methods do not address the more powerful suggestion targeting to be gained by tracking user behavior across affiliated sites.

In view of the foregoing, there is a need for improved techniques for providing a framework for identifying and providing suggestions that supports various advanced features such as, but not limited to, tracking user behavior over affiliated sites and enabling reselling of suggestions.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
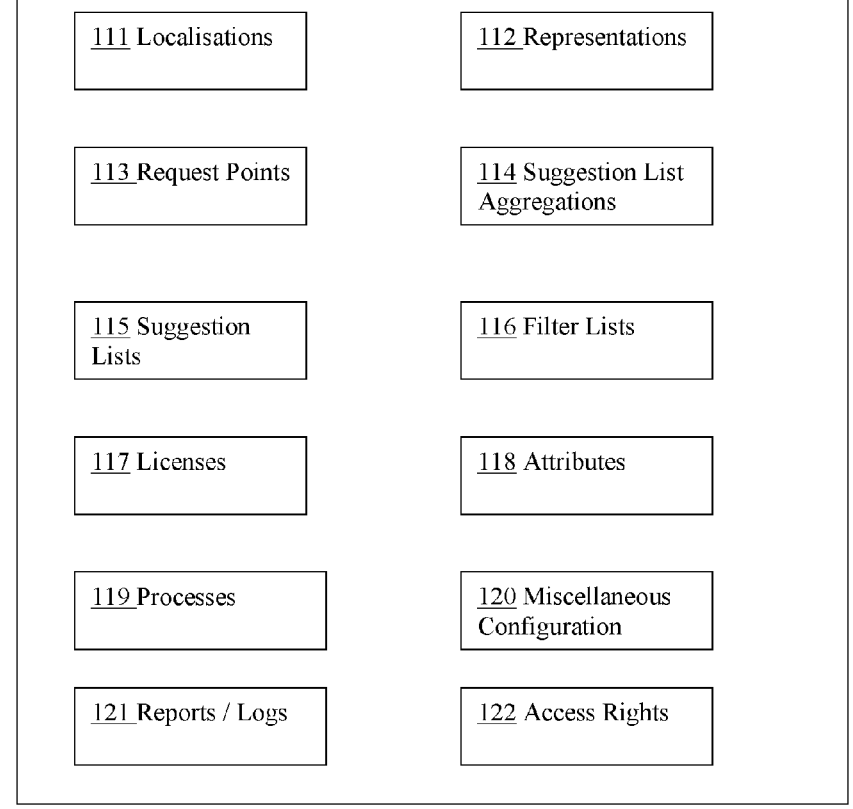
FIG. 1 is a block diagram of an exemplary domain of an ASF illustrating the ownership and relations among the core ASF entities, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Embodiments of the present invention provide an Affiliated Suggestion Framework (ASF) that supports aggregation of suggestions from interchangeable sources, user behavior tracking, and background task processing. In various embodiments, the ASF may support background activities such as, but not limited to, suggestion list preparation, entity matching, session identification, suggestion lead uptake reporting, filtering of suggestions by a set of configurable and interchangeable filters, for example, without limitation, location based filtering, connecting device filtering, etc. Various embodiments may also enable multiple participants, for example, without limitation, many companies can use the same domain, multiple participant accounts for example, without limitation, a company might have many computer systems that represent entities differently, and multi environment support. In embodiments enabling multi environment support, the framework supports the ability for a participant to use multiple environments, for example, without limitation, one production environment and many test environments.

Embodiments of the present invention may also enable features such as, but not limited to, suggestion localization, licensing of suggestion and filter algorithms, suggestion recording, where the ASF records which suggestions have been issued in order to support various aspects of billing and filtering, for example, without limitation, do not re-offer the same suggestion within 2 days of initial offer, and suggestion diagnostics. Using suggestion diagnostics the framework supports the ability to trace why certain suggestions are served. Typically, this feature is utilized for diagnostic and configuration support purposes.

Some embodiments may include participant account representation support. In these embodiments, entities such as, but not limited to, items, users, and behavior types may be represented differently among different participant accounts. For example, without limitation, an item might be known as 1-003-345 for one participant account and 'XYZ' for another participant account.

Some embodiments may include a user identity inference in which an anonymous user's interaction with a participant's system is tracked and later assigned after the user has subsequently been identified. Some embodiments may include entity matching enabling matching and amalgamation of separate participant account entity identities, such as, but not limited to, users or items, to a single environment identity. In embodiments enabling affiliated behavior tracking, the framework supports the tracking and sharing of user behaviors with other affiliated participants. In embodiments enabling affiliated suggestions, the framework supports the ability for a participant to generate and offer suggestions on behalf of another affiliated participant. Some embodiments enable multiple domain support in which all participant and environment states are encompassed within a domain. Domains can be licensed so as to support re-selling and re-labeling of the ASF. In embodiments including support for multiple access methods, the framework supports Web Service style access, such as, but not limited to, JavaScript Object Notation (JSON/HTTP), Simple Object Access Protocol (SOAP), XML/HTTP, or Enterprise JavaBeans (Java EJB) style access, such as, but not limited to, a combination of Remote Method Invocation and Internet Inter-ORB Protocol (RMI/IIOP). Some embodiments may enable management support. These embodiments support a set of application programming interfaces (APIs) that enable an external client to manage the configuration of the ASF. Some embodiments support the ability to produce reports. Examples of such reports include, without limitation, suggestion lead sales, affiliated suggestion lead sales, etc.

Those skilled in the art, in light of the present teachings, will recognize that other features may be included in various embodiments of the present invention such as, but not limited to, a participant's manager identification, an authentication and authorization system, a participant Account's identification, an authentication and authorization system that includes denial of service countermeasures, a billing and invoicing system that is sophisticated enough to support affiliated billing, a payment processing system, a reconciliation system, a collections/license degradation system, etc.

Preferred embodiments of the present invention provide a carrier grade suggestion service capable of supporting advanced features, supports an ecosystem of affiliated participants so that the participants can benefit from suggestion related collaborations, and supports re-labeling of the service. For example, without limitation, if a separate organization wants to offer the complete service of providing a suggestion service with advanced features and support for collaborations, the owner of the preferred embodiment has the option of licensing a separate domain to the organization.

Preferred embodiments of the present invention bring together, at least, but not limited to, the following points. Preferred embodiments support multiple participants with multiple accounts. Preferred embodiment support entities represented by different codes within separate accounts, and translates accordingly. Preferred embodiments support the sharing of suggestions across affiliated participants. By way of supporting affiliated participant suggestions, preferred embodiments incorporate an interchangeable user identification strategy for identifying a user, and an interchangeable user matching strategy for matching users across participants. Preferred embodiments support the concept of a domain, for example, without limitation, a mechanism to encompass all functionality that is separate from other domains. Preferred embodiments support the ability to diagnose actual suggestion results. Also, preferred embodiment support the ability to filter suggestions by an interchangeable set of filters, for example, without limitation, location based filtering, an already purchased filter, a recently offered filter, a connecting device filter, etc.

The currently known personalization solutions treat advertising and recommendations as two separate solutions. If an organization wishes to benefit from both solutions using currently known methods, the organization would most likely have to maintain and manage two separate solutions, or else compromise for a product strong in one area and weak in the other. Preferred embodiments of the present invention generalize advertising and recommendations as suggestions and support both specializations.

Some of the existing recommendation and advertising solutions may attempt to make accurate suggestions based upon known data of a user's interaction with a participant's existing site. However, the site-specific breadth of behavioral data available to the participant account is typically limited to what is collected on the participant account's sites, which in turn limits the accuracy of behavioral analysis and suggestion prediction. Preferred embodiments support the sharing of behavioral data across participant accounts.

Furthermore, there is currently no support for the ability to license the operation of a whole affiliated suggestion ecosystem to third parties. It is common that the only option available to a large organization wishing to benefit from the intellectual property and operational maturity of a smaller organization is to purchase the smaller organization. Preferred embodiments of the present invention support licensing of domains.

As suggestion systems become more sophisticated, their configurations become more arduous. Preferred embodiments of the present invention supply built in ASF tracing that may be used for diagnosis purposes and by supporting multiple environments that may be used to trial configurations prior to going live.

The ASF according to preferred embodiments is a generalized framework that may be implemented to support Web or wireless application protocol (WAP) e-commerce applications, however embodiments of the present invention might equally be used within other diverse applications such as, but not limited to, online gaming, call center routing, campaign driven email, short message service (SMS) or WAP push marketing, etc.

Embodiments of the present invention address the need for organizations to benefit from a suggestion system where the organizations have control over all of the suggestions offered, how the suggestions are derived, how the suggestions are filtered, etc. The organization is able to diagnose unexpected suggestion results and configure the product accordingly, either in a production environment or in another 'test/support' type environment.

Embodiments of the present invention can be hosted on a common server, for example, without limitation, an Internet server, thereby enabling easy integration within existing organizational infrastructures and easy access for support technicians. Preferred embodiments enable organizations to form affiliation relationships with each other. This opens up new ways for organizations to make money and supports the possibility of participants joining the system solely to serve suggestions on behalf of other participants. Operational advantages of the affiliation model according to preferred embodiments are that affiliated participants are able to generate suggestions utilizing knowledge of the user's collective behavior across participant's sites. A non-limiting example of this advantage is that a participant is able to support suggestion preparation methods such as, but not limited to, the following. 'People who browsed this item on any affiliated site ended up purchasing this item on my site,' or 'Show items at a discount on my site if they have already been shown and ignored on an affiliated site'.

Embodiments of the present invention allow the licensing and operation of the domain to other organizations. This means that conglomerates are able to move into the suggestion affiliation business using embodiments of the present invention described herein. Also, embodiments of the present invention support the ability to schedule and run reporting processes to produce timely reports. Example reports may report the benefits of the ASF such as, but not limited to, 'suggestion lead sales,' 'affiliated recommended sales,' etc.

A desired characteristic of embodiments of the present invention is to increase participant revenue by suggesting appropriate items for sale. Another desired characteristic is to establish participants partnering relationships by offering additional affiliation driven revenue channels. Another desired characteristic of embodiments of the present invention is to support the re-selling of suggestion domains. Another desired characteristic is to minimize support requirements of embodiments of the present invention. Yet another desired characteristic of embodiments of the present invention is to inform participants of the value of the ASF by providing appropriate reporting.

In preferred embodiments, the ASF is applicable to recommendation and personalization of advertising solutions. The ASF is software that is designed to execute on a computer server cluster or a single computer server. For the purpose of the present description, a single computer server is treated as a cluster of one. A computer server cluster is a fault tolerant cluster of computers that comprises the computer hardware, operating software, such as, but not limited to, Web server software, database software, application software, etc. Different computer servers within the cluster may perform different tasks and it is anticipated that the various computer servers may be configured differently, for example, without limitation; some servers may be application servers while other servers may be database servers. The ASF is deployed to the server cluster as part of the application software. One way that the ASF may be implemented by way of example is on a cluster of Web servers and database servers connected by the Internet, accessed using a standard Internet protocol such as, but not limited to, HTTP or HTTPS.

FIG. 1 is a block diagram of an exemplary domain 101 of an ASF illustrating the ownership and relations among the core ASF entities, in accordance with an embodiment of the present invention. In alternate embodiments additional entities may be added to this framework without invalidating the effectiveness of the framework for example, without limitation, a billing component, an authentication system, an affiliation discovery component, an affiliation relationship negotiation component etc. FIG. 1 illustrates the basic entities of the ASF and does not address typical architectural considerations of this type of system, for example, without limitation, security, scalability, or resilience; however, typically one or more of the infrastructure, operating software or application software may support these features. In the present embodiment, the outer most element of the ASF is domain 101. A domain includes, without limitation, a group of participants, licenses and environments. A domain can be a re-sellable unit. The ASF can support multiple domains; however all enclosed entities within a domain are typically scoped to the enclosing domain. The ASF Manager may provision domains in their own right, and once provisioned and licensed, the domain manager may configure his domain. In some embodiments a domain may support interchangeable access protocols such as, but not limited to, simple object access protocol (SOAP)/HTTP, RMI/IIOP, JSON/HTTP, interchangeable Participant Manager identifications, authentication and authorization, and may differentiate the service of the domain such as, but not limited to, by offering separate licenses to the participants and participant accounts of the domain.

In the present embodiment, domain 101 comprises a participant 102, a license set 140 and an environment 103 with a participant account 110. Licenses within license set 140 convey usage of domain level features to the domain manager and participants. A non-limiting example is a particular suggestion method commissioned by the domain manger that the domain manager wishes to use to differentiate his domain, and therefore does not wish to share. Within domain 101 there may exist one or multiple participants. However, for the sake of clarity only one participant, participant 102, has been shown by way of example in FIG. 1. Participant 102 represents an individual or organization that is using the ASF. Participant 102 does not interact with the ASF directly. However, the client systems of participant 102 may be represented by participant accounts, for example, without limitation, a participant account 110 in environment 103, and it is these provisioned participant accounts that support the participant client system interaction. Participant 102 may subscribe to a license set 135 that may convey usage rights of certain features such as, but not limited to, filters and suggestion methods. Licenses held against participant 102 are applicable to all participant accounts attributed to participant 102. Participant licenses within license set 135, may be overridden or extended for particular participant accounts by a license set within the participant account, for example, without limitation, a license set 117 in participant account 110.

Within domain 101 there might exist one or multiple environments. Some environments may be private to a participant, for example, without limitation, only containing accounts belonging to a particular participant, and some environments may be public to many participants, for example, without limitation, containing many accounts that belong to many participants thus supporting the concept of affiliation. A participant may therefore participate within multiple environments by having at least one participant account within each environment.

In a simple case, an environment belongs exclusively to a particular participant and only encompasses a single account. This configuration may be used as a test environment or may be all that is necessary to support a participant's single site. In a more complex case, an environment may still belong to a particular participant; however, the environment may contain multiple accounts. This configuration may be used to support a single participant that requires suggestions to feature on many systems in which the systems benefit from the sharing of collective user behavior data or in which the systems may represent some entities differently. In a complex case, an environment may belong to multiple participants, and some of the participants are represented with multiple accounts. This configuration may be used to support participant account affiliation. For the sake of clarity in FIG. 1, only one environment, environment 103, has been shown by way of example.

In the present embodiment, environment 103 comprises users 104, items 105, behaviors 106, a suggestion history 107, attributes 109 and participant account 110. Users 104 represent users of environment 103. In embodiments where the environment has multiple participant accounts, the users are visible to all participating accounts, regardless of access rights. Some of the users within users 104 may be anonymous users. Anonymous users are users that have not been identified at the time of an interaction with the ASF, nonetheless the behavior of anonymous users is tracked by an interchangeable session or permanent tracking strategy.

In the present embodiment, access to items 105 within environment 103 may be restricted to participant accounts with the appropriate access rights; however it is the owning participant account or the domain manager that maintains items 105. Access rights are defined in a set of rights within the participant account, for example, without limitation, access rights 122 in participant account 110. Items 105 may be defined merely for behavior tracking purposes and may not form the basis of suggestions, therefore suggestions may suggest a subset of items, known as suggestible items, for example, without limitation, targeted advertisements for products, 'relevant' news stories/content and 'fast path' navigation links. A non-limiting example of an un-suggestible item is a catalog of items where the ASF is configured to track the behavior of a user browsing the catalog when the ASF is not configured to offer the catalog as suggestion.

Behaviors 106 represent the behaviors of environment 103. Access to behaviors 106 may be restricted to participant accounts with the appropriate access rights; however the owning participant account and domain manager may maintain behaviors 106. Suggestion history 107 represents the history of previously served suggestions within environment 103. Access to suggestion history 107 may be restricted to participant accounts with the appropriate access rights. Attributes 109 represent the attributes of entities such as, but not limited to, users 104 and items 105. Attributes 109 may be used to support aspects of the ASF. Attributes 109 are scoped to environment 103 and are therefore visible to any participant account that has an appropriate set of access rights. Attributes 109 can be overridden or extended by a participant account such as, but not limited to, participant account 110. Environment 103 also comprises a set of miscellaneous configurations 130. Miscellaneous configurations 130 support general features of the ASF. Examples of miscellaneous configurations 130 include, without limitation, the default language, types of behaviors, etc.

An environment may contain many participant accounts additionally the participant accounts contained within a particular environment may even be owned by different participants. However, for clarity, only one such account, participant account 110, is shown by way of example in FIG. 1. Participant account 110 is the ASF manifestation of a participant's client computer system, or possibly many client computer systems that all share a set of entity representations 112. It is envisaged that participant account client systems may send and receive messages to the ASF over a network such as, but not limited to, the Internet. A particular embodiment of the present invention may mandate the deployment of a 'proxy' service within the participant application's infrastructure so as to provide security and session tracking support. A particular style of message may be, without limitation, a SOAP or JSON based Web Service style HTTP/HTTPS message sent over the Internet. The messages instigate processes such as, but not limited to, registering user behaviors or requesting a list of suggestions, as shown by way of example in FIG. 2.

In the present embodiment, participant account 110 comprises entities representing localizations 111, representations 112, request points 113, suggestion list aggregations 114, suggestion lists 115, filter lists 116, licenses 117, attributes 118, and processes 119. Localizations 111 represent language specific attributes of data items returned to the client system. Examples of entities that might be localized in localizations 111 include, without limitation, suggested items, request points, etc. Representations 112 depict representations of environment entities specific to participant account 110. For example, without limitation, a user may be uniquely identified in an environment with an ID of 123; however a particular participant account, and therefore client computer system, may uniquely identify the same user with an ID of 456. Examples of client specific codes that may differ across participant accounts include, without limitation, user codes, behavior codes, item codes, request point codes, etc.

Request points 113 are a representation of the stage at which the client of participant account 110 might be, for example, without limitation, at a landing page, at a shopping cart, at a checkout, etc. A request point from request points 113 may be configured to serve suggestions via suggestion list aggregations 114. Suggestion list aggregations 114 designate the set of suggestion lists 115 that are to be aggregated and allow configuration of ASF behavior necessary to derive a list of suggestions. Example configuration considerations include, without limitation, which suggestion lists to use to fulfill the request, which suggestion method to use to pick suggestions from particular suggestion lists, how to aggregate the lists, which filters to apply, how to handle empty or partially fulfilled (after filtering) lists, etc. In the present embodiment, the ASF anticipates that additional configurations of the aggregation process may be implemented. Suggestion lists 115 are lists of suggestions that are relevant for the suggestion method to entities such as, but not limited to, users, items, participant accounts, or their permutations. Suggestions lists 115 may be prepared automatically or manually depending on the suggestion method associated with a particular suggestion list. In some embodiments, suggestion methods may exist that bypass the need for prepared suggestion lists altogether and intend to pick their suggestions in real time, such as, but not limited to, gathering and presenting suggestions from internal or external data sources.

Filter lists 116 are lists of filters that are applied to each suggestion list within suggestion lists 115. Individual filters within a list may be applied using configurable AND or OR combinations and may be constituted in part by filters inherited from parent filter lists. The filters may be applied when suggestion lists 115 are built and/or when suggestions lists 115 are served, such as, but not limited to, an age filter, a legal jurisdiction filter, a location filter, a connecting device filter, a 'limited time period' filter, a min/max price filter, a stock availability filter, an 'already suggested within X minutes' filter, an 'already purchased within X minutes filter', an 'already offered but not taken up' filter etc. Licenses 117 are used to convey usage rights of certain features upon entities. Examples of licenses 117 include without limitation, to license a 'premium' filter or to license a particular suggestion method to a particular participant account, etc. Attributes 118 are the attributes of entities such as, but not limited to, user and item that are specific to participant account 110. Attributes 118 may be used to support aspects of the ASF. Attributes 118 override or extend attributes 109 of the same entity that are scoped at the environment level. Processes 119 represent configurations necessary to support scheduling and execution of processes normally running in the background. A non-limiting example of a process is to execute a specific suggestion method in order to build a suggestion list or to run ASF housekeeping tasks. Generally, the present embodiment benefits from processes 119 being defined and scheduled for particular participant accounts, participant account 110 in the present example. It is anticipated that a variety of processes may be used to support different embodiments of this invention, for example, without limitation, billing, reporting, collections based license downgrade, database housekeeping, suggestion history pricing, suggestion list preparation, user identification and consolidation etc A miscellaneous configuration set 120 comprises configurations not addressed within other sections necessary to support general features of the ASF. Examples of configurations within miscellaneous configuration set 120 may include, without limitation, the default language code to use, available filters, available suggestion methods, available attributes, etc. Miscellaneous configurations set 120 may override or extend miscellaneous configurations 130 of environment 103. A reports and logs set 121 may be produced by the present embodiment. An example report from reports and logs set 121 may be 'suggestion lead sales', and an example log for reports and logs set 121 may be a diagnostic trace. Access rights 122 represent access rights to data held within environment 103. Access rights 122 restrict data sharing across participant accounts within the same environment. For example, without limitation, an environment might have three participant accounts, Accounts 1, 2 and 3; however commercial agreements may only exist for partnerships between Accounts 1 and 2 and Accounts 1 and 3 with no partnership agreement existing between Accounts 2 and 3. Access rights 122 enforce this integrity. Examples of resources that may be controlled by access rights 122 include, without limitation, user behavior data or an affiliated suggestion list for aggregation.

Figure 2:
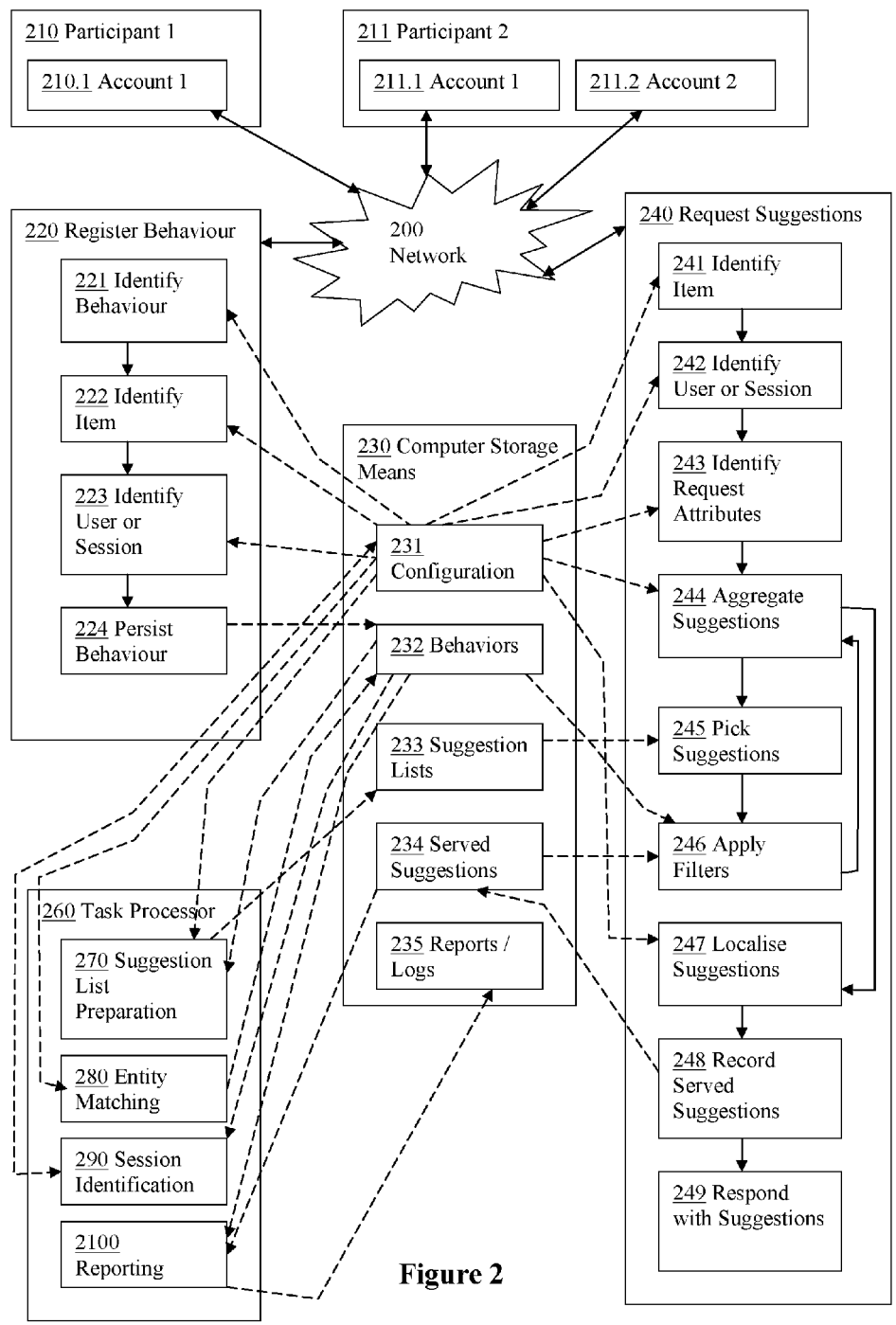
FIG. 2 is a block diagram that describes exemplary entities and process flows within an ASF, in accordance with an embodiment of the present invention.

FIG. 2 is a block diagram that describes exemplary entities and process flows within an ASF, in accordance with an embodiment of the present invention. In FIG. 2 full arrows indicate process workflows, and dashed arrows indicate data store access. In the present embodiment, a computer storage means 230 represents a generic computer based storage mechanism with a configuration element 231, a behaviors element 232, a suggestions lists element 233, a served suggestions element 234, and a reports/logs element 235, which are core storage elements that aid in understanding and interaction of referring processes. The list is by no means exhaustive, for example, without limitation, configuration element 231 may be broken down into many storage elements, storage elements may also be combined, and additional storage elements may be added.

In the present embodiment, a participant 210 has a participant account 210.1, and a participant 211 has participant accounts 211.1 and 211.2. Multiple participants can use the ASF, and a participant may have multiple accounts. The respective managers of the participants are able to manage aspects of ASF. Example ASF aspects that might be managed include, without limitation, configuration element 231, suggestion lists element 233, etc. Participants 210 and 211, a register behavior process 220 and a request suggestions process 240 send and receive data through a network 200, for example, without limitation, the Internet Register behavior process 220 is a process that tracks and stores a user's behavior. Register behavior process 220 comprises a workflow to sequentially invoke the following steps, step 221 to identify behavior, step 222 to identify the item, step 223 to identify the user or the session, and step 224 to persist the behavior. It is envisaged that the order of execution of steps 221 (identify behavior), 222 (identify item) and 223 (identify user or session) is interchangeable. Register behavior process 220 may be invoked either synchronously or asynchronously.

Types of behavior common to all participant accounts may be configured in the environment, for example, without limitation, environment 103 shown by way of example in FIG. 1. Different client systems may represent types of behaviors differently. Step 221 to identify behavior utilizes participant account representations, such as, but not limited to representations 112 shown by way of example in FIG. 1, to translate client system behavior codes into the standard behavior types as defined within the environment. Unrecognized behaviors may be discarded.

This embodiment anticipates that the user's client agent and/or a process within the participant account's infrastructure will send a message to the ASF. The purpose of the message is to register a user's behavior such as, but not limited to, browsing a catalogue, added item to cart, purchased item, viewing item etc.

Step 222 identifies items that may be represented differently within different client systems. This process utilizes participant account representations to translate a client system item code into a unique item ID within the environment. If item attributes are detected within the message and the participant account owns the item, the process may update the attributes of the item within the environment, for example, without limitation, attributes 109 shown by way of example in FIG. 1. If item attributes are included as part of the message and the participant account is not the owner of the item, the process may update the attributes of the item within the participant account, for example, without limitation, attributes 118 shown by way of example in FIG. 1.

In the present embodiment, a participant account may be configured to automatically create unknown items and optionally add default attributes. The process in step 222 gathers the attributes of the item from the environment and the participant account so that subsequent processes may use them; however precedence is given to the attributes gathered from the participant account. In the present embodiment, items are matched across participant accounts as part of an interchangeable automatic or manual entity-matching task 280 that is performed within a task processor 260.

In step 223 the process identifies users that may be represented differently within different client systems. This step utilizes participant account representations, such as, but not limited to, representations 112 shown by way of example in FIG. 2, to translate a client system user code into a unique user ID within the environment. If user attributes are included as part of a message from the user's client agent and/or a process within the participant account's infrastructure, the process in step 223 may update the attributes of the user within the participant account, for example, without limitation, attributes 118 shown by way of example in FIG. 1. A participant account may be configured to automatically create unknown users and optionally add default attributes. The domain manager may update the attributes of the user within the environment, for example, without limitation, attributes 109 shown by way of example in FIG. 1.

In the present embodiment if the message from the user's client agent and/or a process within the participant account's infrastructure does not explicitly supply the user code, the process in step 223 employs an interchangeable strategy to identify a permanent user tracking token. A non-limiting example of this strategy is a method to search the message for a permanent cookie value. If the process detects the permanent user tracking token, the process then attempts to identify the user by interrogating the participant account representation entity for the token. If the user is already explicitly identified and the value of the detected permanent tracking token is different to the token recorded within the participant account representation entity, the participant account representation entity is updated. It is anticipated that the ASF, or a server within the participant account's infrastructure, should attempt to establish a permanent user tracking token with the user's client agent at the earliest opportunity. If the client message from the user's client agent and/or a process within the participant account's infrastructure does not supply the user code and the permanent user tracking token cannot be identified, the process in step 223 employs an interchangeable strategy to detect a session user tracking token within the message. A non-limiting example of this strategy is a method to search the message for a temporary session cookie. If any form of tracking token has been detected and the user code has not been detected, the process in step 223 records this token value so that a latter background process within session identification tasks 290 may identify the session token with a user ID. Those skilled in the art, in light of the present teachings, will recognize that other interchangeable user identification strategies may be employed and that the characteristics and uses of these strategies may be configurable. The identify user or session process in step 223 attaches attributes for the user of the request to the request. The process in step 223 gathers the attributes of the user from the environment and participant account so that subsequent processes may use them. Precedence is given to attributes gathered from the participant account. In step 224 behavior information is saved in a persistent data store.

In the present embodiment task processor 260 manages, schedules, and invokes other processes and various tasks. The processes and tasks may be invoked on a one-off or recurring basis. Examples of some tasks that may be invoked include, without limitation, suggestion list preparation tasks 270, entity matching tasks 280, session identification tasks 290, reporting tasks 2100, etc. These represent just some of any addable and interchangeable processes that may be managed by task processor 260 to support the other features of the ASF. Those skilled in the art, in light of the present teachings, will recognize that various embodiments of the present invention may include other processes and tasks and that certain processes or tasks may be configured and invoked by the task processor, such as, but not limited to, billing, collections based license downgrade, database housekeeping, etc.

Suggestion lists preparation tasks 270 are a family of tasks that generate lists of suggestions according to licensed and interchangeable suggestion methods. Suggestion lists preparation tasks 270 may optionally employ licensed and interchangeable filtering methods. Suggestion lists preparations tasks 270 honor access rights restrictions that dictate the scope of data available for analysis, for example, without limitation, access rights 122 shown by way of example in FIG. 1.

Entity matching tasks 280 are a family of tasks that match and amalgamate entity data within an environment. Entity matching tasks 280 includes, without limitation, an item matching task that may amalgamate all item transactions including, without limitation, those affecting behavior, suggestion lists and suggestion history for items that are considered to be identical by an interchangeable matching strategy, for example, without limitation, matching by item name, item serial number, item book number, etc. Entity matching tasks 280 may also include, without limitation, a user matching task that may amalgamate all user transactions including, without limitation, those affecting behavior, suggestion lists and suggestion history for users that are considered to be identical by an interchangeable matching method, for example, without limitation, matching by email address, telephone number, etc. In various embodiments users may be matched across participant accounts as part of a manual or an automatic process.

Session identification tasks 290 are a family of interchangeable tasks that associate and amalgamate entity transactions when only an unidentified tracking token for a user is known with entity transactions with the same tracking token and the users ID is known, for example, without limitation, transactions that occur after user identification. Reporting tasks 2100 are a family of interchangeable tasks that run various reports. Those skilled in the art, in light of the present teachings, will recognize that the list and type of reports will vary greatly for different embodiments of the present invention. Examples of reports that may be run by reporting tasks 2100 include, without limitation, value of suggestion lead sales, value of affiliated suggestion lead sales, profit made by hosting suggestions on behalf of affiliated participants.

A suggestions request process 240 represents the process of serving a list of suggestions to a requesting computer system in a participant account. Request suggestions process 240 comprises a workflow to invoke the following steps: step 241 to identify the item, step 242 to identify the user or session, step 243 to identify request attributes, step 244 to aggregate suggestions, step 247 to localize suggestions, step 248 to record served suggestions, and step 249 to respond with suggestions. Step 244 to aggregate suggestions comprises further steps, step 245 to retrieve suggestions and step 246 to apply filters. In various embodiments, suggestions request process 240 may be invoked synchronously, however certain steps, for example, without limitation, step 248 to record served suggestions may be spawned asynchronously. Furthermore it is anticipated that the invocation order of some processes may be different.

This embodiment anticipates that the user's client agent and/or a process within the participant account's infrastructure will send a message to the ASF. The purpose of the message will be to request a list of suggestions.

In the present embodiment, step 241 to identify the item process and step 242 to identify the user or session are reuse of step 222 and step 223 defined in register behavior process 220, and as such have already been described within this document. In step 243 a process to identify request attributes interrogates the message for attributes and exposes attributes for subsequent use by the ASF or its interchangeable strategies. Examples of message attributes include, without limitation, requesting language code, client computer timestamp, maximum suggestions to be returned, etc. Examples of the way message attributes would be used are, without limitation, for localization purposes, for supporting specific filters, etc.

In step 244 a process for aggregating suggestions is a configuration driven suggestion aggregator. A non-limiting example of a configuration designates the set of suggestion lists that the process uses to fulfill the message requesting a list of suggestions, the number of suggestions to be contributed from each list, the interchangeable methods that the process uses to pick suggestions from the lists, the interchangeable filters that the process applies to suggestion lists, and the behavior of the aggregation function for particular states of the list, for example, without limitation, complete, partially filled or empty. The above criteria are by no means exhaustive and those skilled in the art, in light of the present teachings, will recognize that other configuration criteria may be used within this aggregation process and other embodiments of the present invention such as, but not limited to, a maximum allowed response time, action on exceeding a maximum response time, a period of time before a prepared suggestion list is considered stale, an action to perform for stale suggestion lists etc.

Step 244 identifies the source of suggestions by interrogating the suggestion list aggregations entity of a participant account, for example without limitation, suggestion list aggregations 114 shown by way of example in FIG. 1. For each source of suggestions identified by the configuration, the aggregate suggestions process delegates the picking of suggestions from the designated list to an interchangeable and licensed suggestion picking method, for example, without limitation, pick for the current item, pick for the current user, pick for the current item and the current user or pick regardless of current item or current user, as depicted in step 245. The picking method in step 245 picks suggestions from lists defined within the suggestions list entity, for example, without limitation, suggestion lists 115 shown by way of example in FIG. 1. Once picked, in step 246, the lists are filtered by an interchangeable and licensed set of filters and configured in a filter lists entity, for example, without limitation, filter lists 116 shown by way of example in FIG. 1. The process then returns to the aggregate suggestions process in step 244, and the resulting subset is made available to be aggregated into a main response list. In accordance with access rights, this process may be configured such that suggestions from other participant accounts may be considered for aggregation. The aggregate suggestion process in step 244 determines how to aggregate the lists based upon configuration criteria. In the present embodiment, the aggregate suggestions process in step 244 optionally records its workflow and decisions to a trace log.

After step 244 is complete, step 247 to localize suggestions adorns the now aggregated set of suggestions and the suggestions themselves with previously configured language specific data items. Examples of the localized data items include, without limitation, text strings, URLs, etc. The localize suggestions process in step 247 uses a localizations entity as the source of its data items, for example, without limitation, localizations 111 shown by way of example in FIG. 1. In step 248 a record server suggestions process persists a suggestions history record, for example, without limitation, suggestions history 107 shown by way of example in FIG. 1, for every suggestion that is to be served. Finally, in step 249 the process returns the set of suggestion to the requesting client computer.

In alternate embodiments of the present invention various other processes may execute within the ASF. Some examples of other processes include, without limitation, billing tasks, data housekeeping, license expiration tasks, license degradation tasks, etc. Furthermore, in alternate embodiments, there may be multiple methods to manage the ASF. A non-limiting example of a means to manage the ASF is to expose an Application Programming Interface (API). A non-limiting example of an implementation of the API could be as a set of Web Services Embodiments of the present invention lend themselves to different target markets such as, but not limited to, small businesses looking to control and configure a suggestions service, large or medium businesses looking to support multiple systems by one solution, all businesses looking to affiliate suggestions and build partnerships, advertising sites looking to generate money from affiliated suggestions, business support businesses, for example, without limitation, web designers or banks, looking to attract new business by differentiating and specializing their offering, marketing companies looking to re-sell the complete solution, solution integrators looking to support the marketing and integration of the ASF, etc.

Figure 3:
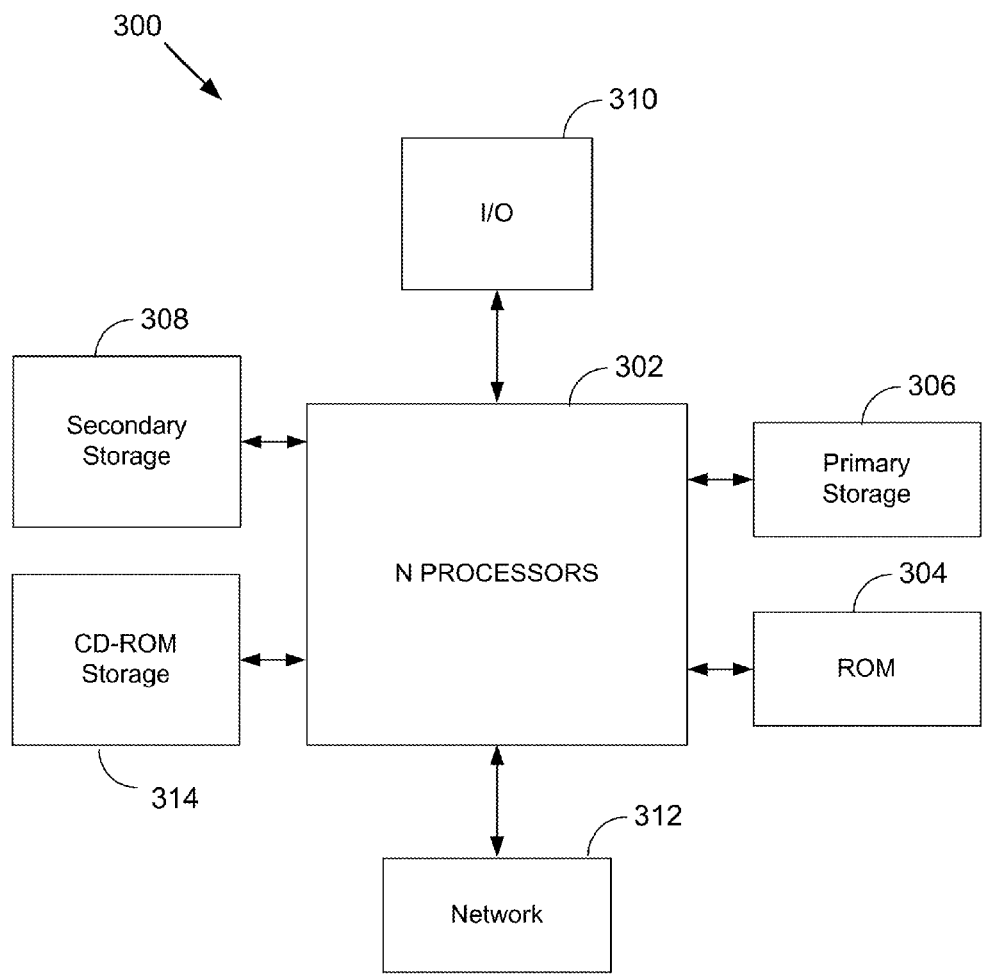
FIG. 3 illustrates a typical computer system that, when appropriately configured or designed, can serve as a computer system in which the invention may be embodied.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like FIG. 3 illustrates a typical computer system that, when appropriately configured or designed, can serve as a computer system in which the invention may be embodied. The computer system 300 includes any number of processors 302 (also referred to as central processing units, or CPUs) that are coupled to storage devices including primary storage 306 (typically a random access memory, or RAM), primary storage 304 (typically a read only memory, or ROM). CPU 302 may be of various types including microcontrollers (e.g., with embedded RAM/ROM) and microprocessors such as programmable devices (e.g., RISC or SISC based, or CPLDs and FPGAs) and unprogrammable devices such as gate array ASICs or general purpose microprocessors. As is well known in the art, primary storage 304 acts to transfer data and instructions uni-directionally to the CPU and primary storage 306 is used typically to transfer data and instructions in a bi-directional manner. Both of these primary storage devices may include any suitable computer-readable media such as those described above. A mass storage device 308 may also be coupled bi-directionally to CPU 302 and provides additional data storage capacity and may include any of the computer-readable media described above. Mass storage device 308 may be used to store programs, data and the like and is typically a secondary storage medium such as a hard disk. It will be appreciated that the information retained within the mass storage device 308, may, in appropriate cases, be incorporated in standard fashion as part of primary storage 306 as virtual memory. A specific mass storage device such as a CD-ROM 314 may also pass data uni-directionally to the CPU.

CPU 302 may also be coupled to an interface 310 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 302 optionally may be coupled to an external device such as a database or a computer or telecommunications or internet network using an external connection as shown generally at 312, which may be implemented as a hardwired or wireless communications link using suitable conventional technologies. With such a connection, it is contemplated that the CPU might receive information from the network, or might output information to the network in the course of performing the method steps described in the teachings of the present invention.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing novel means for and/or steps described that the applications designer will selectively decide, depending upon the practical considerations of the particular implementation, to carry out and/or locate within the jurisdiction of the USA. For any claims construction of the following claims that are construed under 35 USC § 112 (6) it is intended that the corresponding means for and/or steps for carrying out the claimed function also include those embodiments, and equivalents, as contemplated above that implement at least some novel aspects and objects of the present invention in the jurisdiction of the USA. For example, participant account infrastructure, participant account interactions and the network (200), may be performed and/or located outside of the jurisdiction of the USA while the remaining method steps and/or system components of the forgoing embodiments are typically required to be located/performed in the US for practical considerations.

Having fully described at least one embodiment of the present invention, other equivalent or alternative methods of identifying suggestions to computer users according to the present invention will be apparent to those skilled in the art. The invention has been described above by way of illustration, and the specific embodiments disclosed are not intended to limit the invention to the particular forms disclosed. For example, the particular implementation of the ASF may vary depending upon the particular type of network used. The networks described in the foregoing were directed to Internet implementations; however, similar techniques are to implement the ASF on a private network such as, but not limited to, a network on a college campus, in a library or within a company. Non-internet based implementations of the present invention are contemplated as within the scope of the present invention. The invention is thus to cover all modifications, equivalents, and alternatives falling within the spirit and scope of the foregoing disclosure.

What is claimed is:

1. A method for identifying and providing suggestions within a framework of a domain, wherein the domain is a computer system or framework that hosts and centrally manages multiple participants and provides a plurality of administrative services to the participants, the domain comprising a set of licenses and at least one environment; wherein the licenses define how data is shared between participants; wherein the at least one environment comprises a respective participant account for each participant, and a list of items to form the basis of suggestions; and wherein the domain is configured to share suggestions with participant accounts within the environment according to the licenses, the method comprising the steps of:

receiving a message to register information of a behavior of a user in the at least one environment within said domain, said receiving a message causing one or more behavior processes to identify said behavior, identify at least one item associated with said behavior, identify an identity of said user, and store information obtained during said identifying, and one or more task processes to prepare at least one suggestion list using said information and a stored configuration, match and join item and user data in said environment, and associate and join item and user transactions;

receiving a request from a participant account in said environment for suggestions to serve to said user visiting a request point within said domain where said participant account belongs to a participant belonging to a group of affiliated participants within said domain, said receiving a request causing one or more suggestion processes to identify, from said request, a request item, identify said identity of said user and attributes associated with said request, said one or more suggestion processes being further operable for identifying, from said request point, stored behavior information of said user visiting said participant account and stored behavior information of said user visiting accounts of said affiliated participants, and a list of suggestion methods and filters, said list being at least in part determined by a license of said participant account, said suggestion processes being further operable for applying one or more suggestion methods and filters from said list to a suggestion list set to aggregate suggestions into a resultant set of relevant suggestions; and responding to said request with served suggestions comprising said resultant set, said participant being enabled to offer said served suggestions, within said domain, on behalf of another affiliated participant of said group of affiliated participants.

2. The method as recited in claim 1, wherein said suggestion list set includes a plurality of suggestion lists prepared during registration of a plurality of user behaviors associated with a plurality of accounts of affiliated participants.

3. The method as recited in claim 1, wherein in said process of aggregating suggestions, suggestions are picked from said suggestion list and filtered with recorded served suggestions.

4. The method as recited in claim 1, wherein said at least one or more suggestion processes further localize suggestions with language specific data items.

5. The method as recited in claim 1, wherein said at least one or more task processes generates and stores reports associated with suggestions.

6. The method as recited in claim 1, further comprising the step of managing at least said stored configuration.

7. The method as recited in claim 1, wherein said domain further includes said group of affiliated participants, associated accounts and licenses in which participant licenses are dependent on domain level licensing.

8. The method as recited in claim 1, wherein said suggestions at least include advertising and recommendations.

9. The method as recited in claim 1, further comprising the step of licensing said domain to at least support re-selling and re-labeling the framework.

10. A method for identifying and providing suggestions within a framework of a domain wherein the domain is a computer system or framework that hosts and centrally manages multiple participants and provides a plurality of administrative services to the participants, the domain comprising a set of licenses and at least one environment; wherein the licenses define how data is shared between participants;

wherein the at least one environment comprises a respective participant account for each participant, and a list of items to form the basis of suggestions; and wherein the domain is configured to share suggestions with participant accounts within the environment according to the licenses, the method comprising the steps of:

licensing a domain;

receiving a message to register information of a behavior of a user and for initiating processes to process behavior information and prepare at least one suggestion list;

receiving a request from a participant account for suggestions to serve and for initiating processes for identifying a list of suggestion methods and filters and to aggregate suggestions into a resultant set of relevant suggestions; and responding to said request with said resultant set in which said participant of said participant account is enabled to offer said resultant set on behalf of another affiliated participant.

11. A computer program product for identifying and providing suggestions within a framework of a domain, wherein the domain is a computer system or framework that hosts and centrally manages multiple participants and provides a plurality of administrative services to the participants, the domain comprising a set of licenses and at least one environment; wherein the licenses define how data is shared between participants; wherein the at least one environment comprises a respective participant account for each participant, and a list of items to form the basis of suggestions; and wherein the domain is configured to share suggestions with participant accounts within the environment according to the licenses, the computer program product comprising:

computer code for receiving a message to register information of a behavior of a user in said at least one environment within said domain;

computer code for identifying said behavior, identifying at least one item associated with said behavior, identifying an identity of said user, and storing at least information obtained during said identifying;

computer code for preparing at least one suggestion list using said information and a stored configuration, matching and joining item and user data in said environment, and associating and joining item and user transactions;

computer code for receiving a request from a participant account in said environment for suggestions to serve to said user visiting a request point within said domain where said participant account belongs to a participant belonging to a group of affiliated participants within said domain;

computer code for identifying, from said request, a request item, identifying said identity of said user and attributes associated with said request, identifying, from said request point, stored behavior information of said user visiting said participant account and stored behavior information of said user visiting accounts of said affiliated participants, and a list of suggestion methods and filters, said list being at least in part determined by a license of said participant account, and applying one or more suggestion methods and filters from said list to a suggestion list set to aggregate suggestions into a resultant set of relevant suggestions;

computer code for responding to said request with served suggestions comprising said resultant set, said participant being enabled to offer said served suggestions, within said domain, on behalf of another affiliated participant of said group of affiliated participants; and a non-transitory computer readable media storing said computer code.

12. The computer program product as recited in claim 11, wherein said suggestion list set includes a plurality of suggestion lists prepared during registration of a plurality of user behaviors associated with a plurality of accounts of affiliated participants.

13. The computer program product as recited in claim 11, further comprising computer code for picking suggestions from said suggestion list and filtering with recorded served suggestions.

14. The computer program product as recited in claim 11, further comprising computer code for localizing suggestions with language specific data items.

15. The computer program product as recited in claim 11, further comprising computer code for generating and storing reports associated with suggestions.

16. The computer program product as recited in claim 11, wherein said domain further includes said group of affiliated participants, associated accounts and licenses in which participant licenses are dependent on domain level licensing.

17. The computer program product as recited in claim 11, wherein said suggestions at least includes advertising and recommendations.

18. A system for identifying and providing suggestions within a framework of a domain, wherein the domain is a computer system or framework that hosts and centrally manages multiple participants and provides a plurality of administrative services to the participants, the domain comprising a set of licenses and at least one environment; wherein the licenses define how data is shared between participants; wherein the at least one environment comprises a respective participant account for each participant, and a list of items to form the basis of suggestions; and wherein the domain is configured to share suggestions with participant accounts within the environment according to the licenses, the system comprising:

a licensing module for licensing the framework;

a registration module for registering information of a behavior of a user and for initiating processes to process behavior information and prepare at least one suggestion list;

a processor arranged to process a request from a participant account for suggestions to serve and for initiating processes for identifying a list of suggestion methods and filters and to aggregate suggestions into a localized resultant set of relevant suggestions; and a response module for responding to said request with served suggestions comprising said-localized resultant set in which said participant of said participant account is enabled to offer served suggestions on behalf of another affiliated participant.

19. A method for identifying and providing suggestions within a framework of a domain, wherein the domain is a computer system or framework that hosts and centrally manages multiple participants and provides a plurality of administrative services to the participants, the domain comprising a set of licenses and at least one environment; wherein the licenses define how data is shared between participants; wherein the at least one environment comprises a respective participant account for each participant, and a list of items to form the basis of suggestions; and wherein the domain is configured to share suggestions with participant accounts within the environment according to the licenses, the method comprising steps of:

a user entering a request point within a participant account within said at least one environment within said domain, said participant account belonging to a participant belonging to a group of affiliated participants within said domain, said entering causing a process, associated with said participant account, to be operable for requesting suggestions to serve to said user, said request causing one or more suggestion processes to be operable for identifying, from said request point, stored behavior information of said user visiting said participant account and stored behavior information of said user visiting accounts of said affiliated participants, and a list of suggestion methods and filters, said list being at least in part determined by a license of said participant account, said suggestion processes being further operable for applying one or more suggestion methods and filters from said list to a suggestion list set to aggregate suggestions into a resultant set of relevant suggestions, said suggestion processes being further operable for responding to said process associated with said participant account, with said resultant set; and said user receiving said resultant set of relevant suggestions at said request point.

20. The method as recited in claim 19, in which said participant and other participants having participant accounts within said environment are enabled for entering into agreements for sharing stored behavior information.

21. The method as recited in claim 19, in which said participant can serve said resultant set of relevant suggestions on behalf of another participant in said group of affiliated participants.

22. The method as recited in claim 19, in which each of said suggestion methods at least comprises a list preparation method being operable for preparing suggestion lists in a background mode and a real-time suggestion picking method being operable for at least picking suggestions from prepared lists.

23. The method as recited in claim 19, in which said resultant set of relevant suggestions comprises a configured size and said suggestion processes being further operable for applying said suggestion methods and filters to fill said resultant set.

24. The method as recited in claim 19, in which a first portion of a list of said suggestion methods is licensed by said domain and a second portion of said first portion is licensed by said participant.

* * * * *